June 15, 1926.
G. M. HOWELL
1,588,422
AUTOMATIC CONTROL FOR MOTOR VEHICLES
Filed March 24, 1926      2 Sheets-Sheet 1
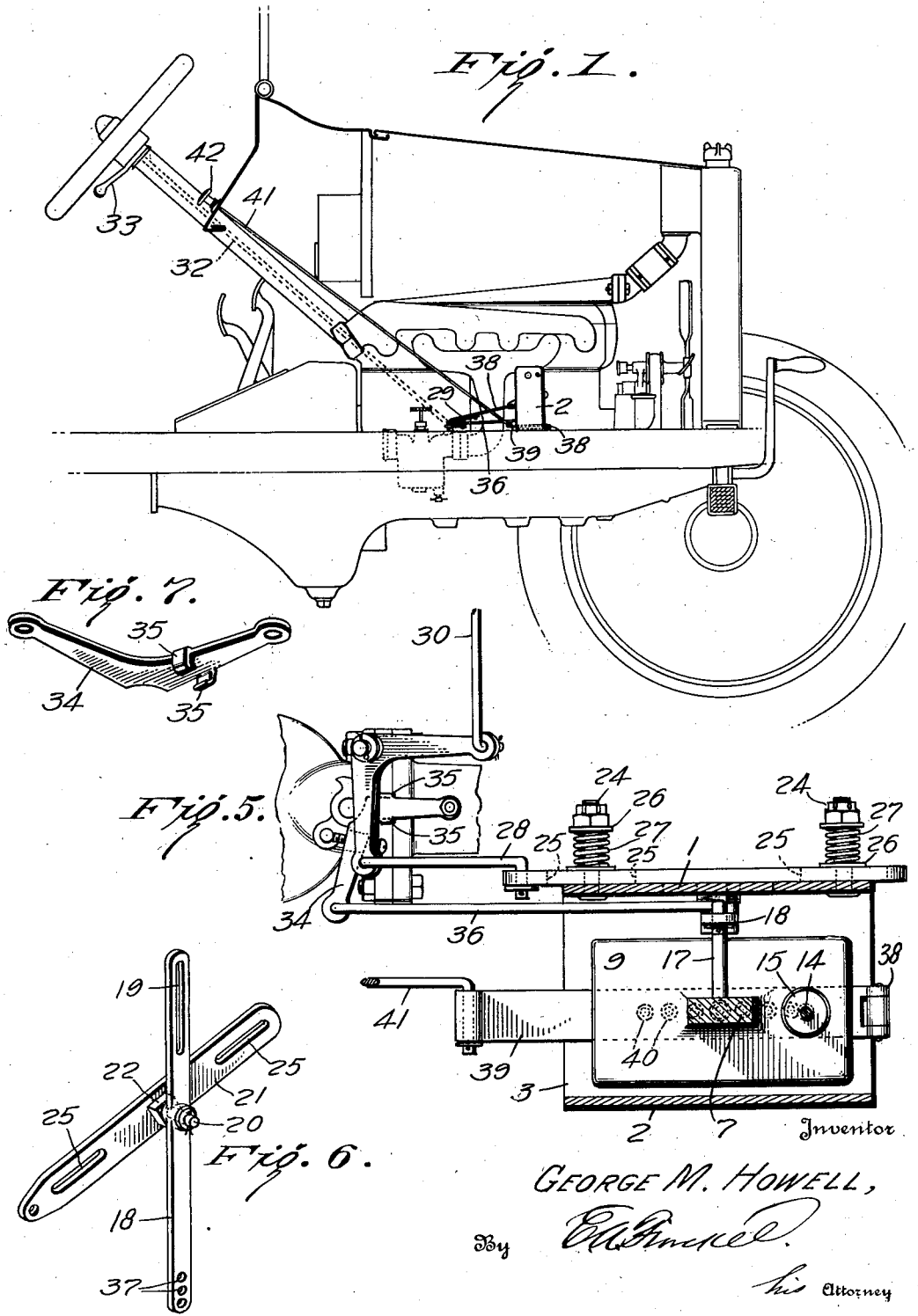
Inventor
GEORGE M. HOWELL,
By
his Attorney June 15, 1926.
G. M. HOWELL
1,588,422
AUTOMATIC CONTROL FOR MOTOR VEHICLES
Filed March 24, 1926    2 Sheets-Sheet 2
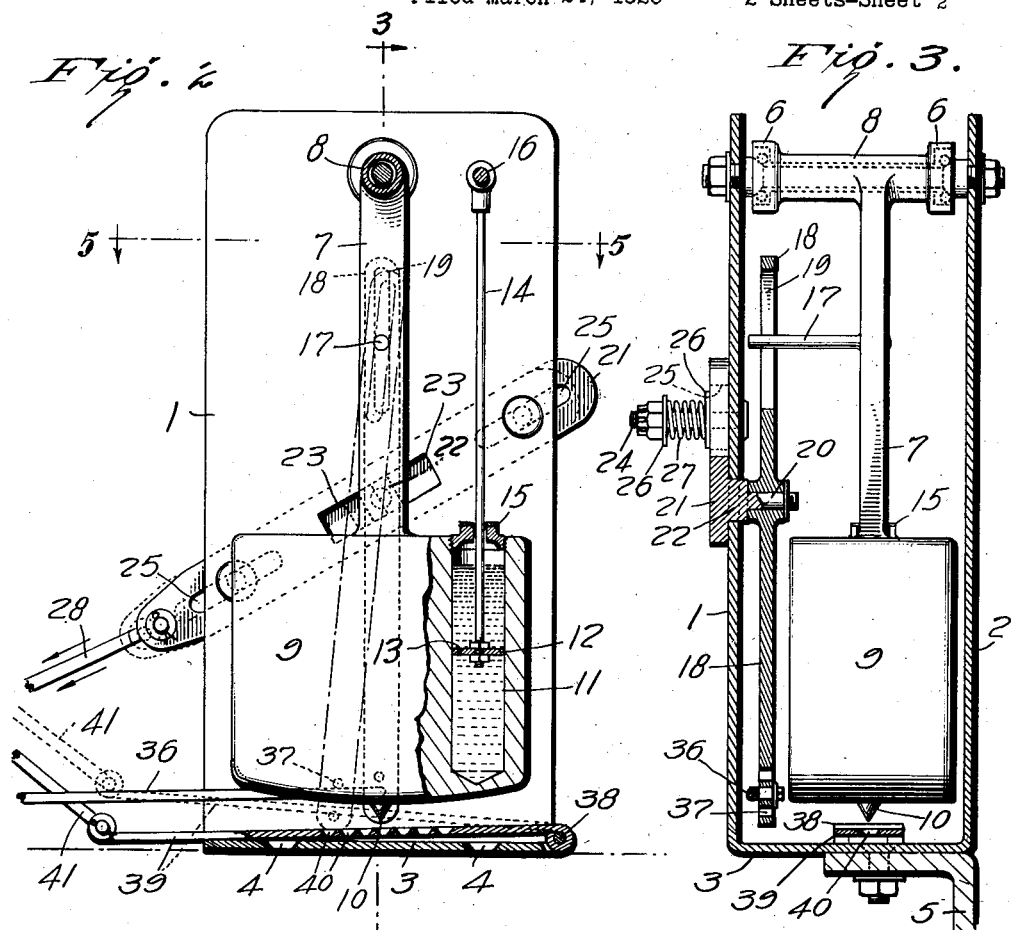
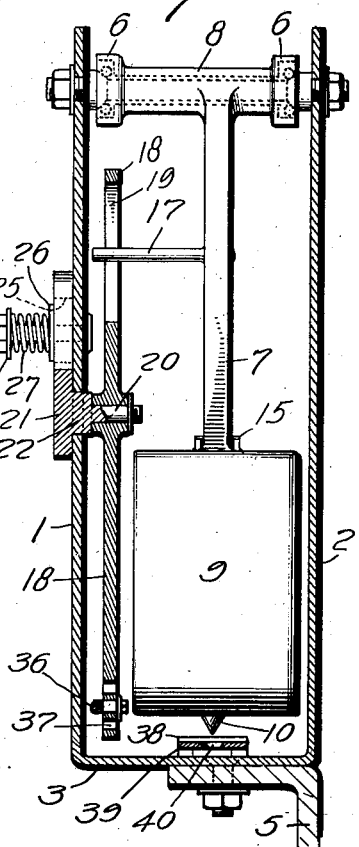
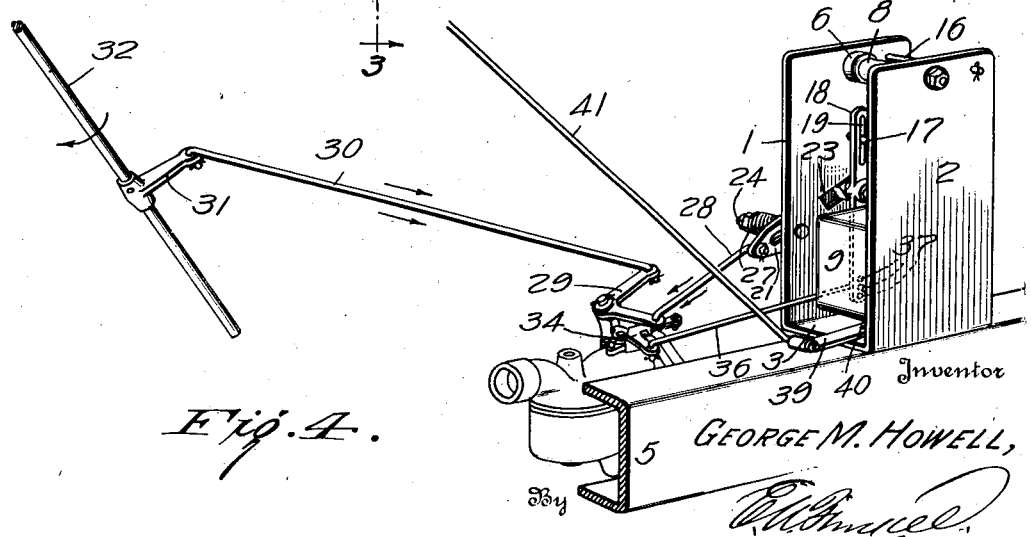
Inventor
GEORGE M. HOWELL,
By
his Attorney Patented June 15, 1926.

1,588,422

UNITED STATES PATENT OFFICE.

GEORGE M. HOWELL, OF NORTHUMBERLAND, PENNSYLVANIA.

AUTOMATIC CONTROL FOR MOTOR VEHICLES.

Application filed March 24, 1926. Serial No. 97,078.

This invention relates to controls for motor vehicles, and particularly to means for automatically controlling the admission of the combustible mixture to the engines of such vehicles.

The object of the invention is to provide a controlling means, of the gravity or pendulum-operated type, of simple and economical construction and effective and practical in operation, and which may readily be applied to vehicles already built and in use.

A further object of the invention is to provide a pendulum controlled mechanism of this character, whereby the connection between the pendulum and the throttle may easily and readily be adjusted by the driver to set the throttle in different speed limit positions and to automatically control the running of the vehicle under varying loads and in running up and down grade.

A further object of the invention is to provide means for holding the pendulum stationary while running on a level road, in order to maintain the pendulum in a fixed and inoperative condition, while running the vehicle, to adjust the throttle to any desired predetermined speed limit position.

The invention consists in an automatic control for motor vehicles, comprising a pendulum, and connections between the pendulum and throttle for automatically operating the throttle, including a lever having an adjustable fulcrum for changing the position of the throttle for controlling the vehicle at varying predetermined speeds.

The invention also consists in a frame, a pendulum pivotally mounted in said frame, a rocking lever fulcrumed in said frame, and having a slidable connection with said pendulum at one side of the fulcrum, and a rod connecting the other side of said lever with the throttle, and means for adjusting the fulcrum of said rocking lever to change the position of the throttle for controlling the vehicle at varying speed limits.

The invention also consists in the combination with a pendulum-operated controlling means for motor vehicles, of manually operated means for holding the pendulum in inoperative condition during the running of the vehicle, the connections between the pendulum and the throttle permitting the control of the throttle while the pendulum is in such condition.

The invention also consists in certain details of construction and combination of parts, all substantially as I will proceed now more particularly to set forth and finally claim.

In the accompanying drawings, illustrating the invention, in the several figures of which like parts are similarly designated, Figure 1 is a side elevation of the front portion of a motor vehicle with the invention applied thereto. Fig. 2 is a vertical section, on a larger scale, of the pendulum and its supporting frame and its operative connections, the pendulum being broken away to show the dash-pot formed therein. Fig. 3 is a vertical section taken substantially on the line 3—3, Fig. 2, and looking in the direction of the arrows. Fig. 4 is a perspective view, on a smaller scale, of a portion of the engine and the pendulum and its operating connections with the throttle and control rod. Fig. 5 is a horizontal section taken substantially on the line 5—5, Fig. 2, and looking in the direction of the arrows. Fig. 6 is a perspective view of the rocking lever and its adjustable fulcrum carrier. Fig. 7 is a perspective view of the bell-crank connection for the throttle.

In the preferred construction, and as herein illustrated, the invention comprises a U-shaped frame consisting of two side walls 1 and 2, and a connecting base 3, provided with bolt holes 4, by which the frame may be secured upon any suitable part of the engine or machine or vehicle, and I have herein shown the frame attached to the beam 5 of the engine. Mounted in the upper ends of the frame upon any suitable bearings, such as ball bearings 6, Fig. 3 is a pendulum comprising the stem 7, having the tubular bearing 8 at its upper end, a weight 9 at its lower end, and a lug 10 projecting from the bottom of the weight. The weight 9, at one side or end, is provided with an opening or well 11, adapted to receive oil or other cushioning medium, a piston 12, fitting in said well or opening, provided with an escape passage 13, and a connecting rod 14, projecting through a packed bushing 15 fitted in the top of said well and extending to or near the top of the frame, and pivotally supported in said frame, as at 16.

The shank 7 of the pendulum is provided with an off standing pin 17, about centrally thereof, and fulcrumed in the side member 1 of the frame, is a lever 18, having in its upper end a slot 19, through which the pin projects.

In accordance with this invention, the fulcrum upon which the lever 18 is supported, is adjustably mounted in the side wall member 1, of the frame, said fulcrum comprising the pin 20, upon which the lever 18 is mounted, said pin being carried by a sliding plate 21, having a lug 22, fitted and slidably mounted in a slot 23, in the side wall 1 of the frame. The slide 21, is adjustably mounted upon the side wall 1, of the frame, by means of bolts 24, passing through slots 25, in the slide 21, and engaging the side wall 1 of the frame, the said bolts being provided with washers 26, and interposed springs 27, to yieldingly and frictionally hold the slide plate 21, against the side wall 1 of the frame. The slide 21 and its connections with the frame, are herein shown arranged at an angle to the frame for a purpose presently appearing, although the position of the slide with relation to the frame may be changed and still serve the purpose of the invention.

The slide plate 21, is pivotally connected to a rod 28 extending to and connected with one arm of the bell crank lever 29, the other arm of said bell crank lever being connected by a rod 30, extending to and connected with an arm 31, fixed to a control rod 32, adjacent to the steering post of the vehicle, and provided at its upper end with a hand lever 33, adjacent to the steering wheel.

A bell crank lever 34, having ears 35, is connected with the throttle operating stem, by means of the ears 35, on one arm thereof, the other arm of said bell crank lever 34, being connected with the lower arm of the rocking lever 18, by means of a rod 36, the said rod being adjustably connected with the lever 18, by means of a series of holes 37, in the lower end of said lever 18.

Hinged to the rear end of the base member 3 of the pendulum frame, as at 38, and extending over and projecting beyond the base 3 of the frame, is a plate 39, having a series of notches or openings 40, lying in the path of the stud 10, on the lower end of the pendulum, the free end of the plate 39 being connected with a rod 41, extending to the dash of the vehicle and provided with an operating handle 42, whereby the plate 39 may be raised, to bring one of the notches or perforations 40 in said plate into engagement with the stud 10, on the lower end of the pendulum, to hold the pendulum in a fixed position.

The operation of the device is as follows:

In the running of a vehicle with this invention applied thereto, and in order to adjust the throttle to any desired or predetermined speed limit, the vehicle being upon a level road during this adjustment for the speed limit, the driver pulls upon the handle 42, thereby raising the plate 39, and brings one of the notches or perforations therein into engagement with the lug 10, on the pendulum, thereby holding the pendulum in a substantially vertical position. The driver then starts the vehicle, and by the control lever 33, is enabled, through the operating rod 32, connecting rod 30, bell crank 29, connecting rod 28, slide 21 and its adjustable fulcrum, to shift the slide plate with its attached fulcrum, and thereby move the rocking lever 18, the sliding pin and slot connection between the rocking lever and pendulum, permitting movement of said rocking lever in the supporting frame, and thereby adjusting the throttle through the connecting rod 36. By this adjustment, the throttle may be set or fixed for manual control of the engine at any desired predetermined speed limit while running on level roads and for automatic control by the pendulum in running up and down grades. The desired speed limit position of the throttle being attained, the operator releases the plate 39, from the pendulum, and in the subsequent running of the vehicle, and in going up and down grades, the pendulum will be free to automatically control or adjust the throttle to open and close the throttle in accordance with the inclination of the up or down grade. The operation of the throttle, through the pendulum, will be effected by means of the pin and slot connection between the pendulum and rocking lever and the connecting rod 36, independently of the mechanism for setting the device for different speed limits by the adjustment of the fulcrum of the rocking lever.

During the operation of the pendulum, it will be observed that the dash pot attachment, including the oil well 11 formed in the pendulum and the piston operating therein, will maintain the pendulum in a steady position against jars and vibrations due to the vehicle running over rough roads.

It will be understood that the pendulum may be attached to the vehicle at any convenient or suitable place, and suitable connections between the pendulum, throttle and control levers be made to suit the location of the pendulum, and suitable changes be made in the construction of the adjustable fulcrum for the rocking lever, for adjusting the throttle to effect different throws of the valve at open or closed positions, that is to say, for effecting more throw toward the open position when the throttle is nearly closed, and more throw toward the closed position when the throttle is in open position to accommodate slow or fast speeds or heavy or light loads.

It will be observed from the construction and operation of this invention, that the usual foot accelerator pedal and its connections with the throttle for manual control of the vehicle, may be dispensed with, or may remain upon the vehicle to which this invention is applied, the manual control of the throttle, however, being possible by the control lever 33, for adjusting the fulcrum of the rocking lever, whereby the control of the throttle is effected through the connections between the pendulum and throttle with the rocking lever, the sliding connection between the rocking lever and the pendulum permitting such operation, not only when the pendulum is free to swing, but also when it is held in stationary position.

It will be understood also that the invention is not limited to the exact details of construction and combination of parts herein shown and described, and that the invention is subject to various changes in combination and details of parts, without altering the scope of the claims herein made.

What I claim is:

1. An automatic control for motor vehicles, comprising a pendulum, and connections between said pendulum and the throttle, including a rocking lever, and an adjustable fulcrum for said lever for varying the position of the throttle relatively to its connections with said pendulum and rocking lever to position the throttle for controlling the vehicle under varying speed limits.

2. An automatic control for motor vehicles, comprising a pendulum, a rocking lever having a slidable connection with said pendulum, a rod for connecting said rocking lever with the throttle, and an adjustable fulcrum for said rocking lever whereby the throttle may be adjusted to varying positions to control the vehicle at different predetermined speed limits.

3. An automatic control for motor vehicles, comprising a frame, a pendulum pivotally mounted upon said frame, a rocking lever adjustably fulcrumed in said frame and having a slidable connection with said pendulum, a rod for connecting said rocking lever to the throttle of the engine, and means for adjusting the fulcrum of said lever in the said frame to position the throttle for control of the vehicle at different predetermined speed limits.

4. An automatic control for motor vehicles, comprising a frame, a pendulum pivotally mounted upon said frame, a rocking lever adjustably fulcrumed in said frame and having a slidable connection with said pendulum, a rod for connecting said rocking lever to the throttle of the engine, means for adjusting the fulcrum of the said lever in said frame to position the throttle for control of the vehicle at different predetermined speed limits, and a dash pot formed in the body of said pendulum, having its piston rod pivotally mounted in said frame.

5. An automatic control for motor vehicles, comprising a frame, a pendulum pivotally mounted upon said frame, a rocking lever adjustably fulcrumed in said frame and having a slidable connection with said pendulum, a rod for connecting said rocking lever to the throttle of the engine, means for adjusting the fulcrum of said lever in the said frame to position the throttle for control of the vehicle at different predetermined speed limits, and means for holding the pendulum in fixed position while adjusting the fulcrum of said rocking lever.

6. An automatic control for motor vehicles, comprising a frame, a pendulum pivotally mounted in said frame, a rocking lever having a slidable connection with said pendulum at one end, and having its other end connected with the throttle of the engine, an adjustable fulcrum for said rocking lever mounted in said frame, a sliding plate to which said fulcrum is fixed, means for frictionally holding said plate in engagement with said frame, and means for moving said plate to adjust the fulcrum of said lever, to position the throttle for automatic control of the vehicle at different predetermined speed limits.

7. An automatic control for motor vehicles, comprising a frame, a pendulum pivotally mounted in said frame, a rocking lever fulcrumed to said frame and having a slidable connection with the pendulum at one end, a rod for connecting the other end of said rocking lever with the throttle of the engine, a slidable plate mounted upon the said frame and having a slotted and spring pressed bolt connection with said frame, a boss on said sliding plate engaging an elongated slot in said frame and carrying the fulcrum of said rocking lever, and means for adjusting said sliding plate to position the throttle for control of the vehicle at different predetermined speed limits.

8. An automatic control, for motor vehicles, comprising a frame, a pendulum pivotally mounted in said frame, a rocking lever adjustably fulcrumed in said frame, and having a slidable connection with said pendulum at one side of its fulcrum, a bell crank lever fixed to the throttle of the engine, a rod for connecting the rocking lever at the other side of its fulcrum with said bell crank lever, a slidable plate fitted upon said frame, and carrying the fulcrum of said rocking lever, means for holding said sliding plate in frictional engagement with the frame, a second bell crank lever mounted upon the engine, a rod for connecting one end of said bell crank lever with said sliding plate, and a manual control rod connected with the other end of said bell crank lever for moving said sliding plate to adjust the fulcrum of said rocking lever.

9. An automatic control for motor vehicles, comprising a frame, a pendulum pivotally mounted in said frame, a rocking lever fulcrumed in said frame, and means for connecting said rocking lever with the throttle of the engine, the body of said pendulum provided with a well or opening formed therein, and a piston fitted in said well and pivotally mounted in the frame in parallelism with said pendulum, and serving as a dash pot for said pendulum.

10. An automatic control for motor vehicles, comprising a frame, a pendulum pivotally supported in said frame, a rocking lever adjustably fulcrumed in said frame, and having a slidable connection with the pendulum, a rod for connecting said rocking lever with the throttle, means for adjusting the fulcrum of said rocking lever to position the throttle at different speed limits, a plate hinged to said frame, and manual means for moving said plate into engagement with the pendulum, to hold the pendulum stationary during the adjustment of the throttle.

11. An automatic control for motor vehicles, comprising a pendulum, means for pivotally supporting said pendulum adjacent to the engine, connections between the said pendulum and throttle for automatically controlling the speed of the engine, means for adjusting the connections between said pendulum and throttle to position the throttle for control at different speed limits, and manually controlled means for holding the pendulum in fixed position during the adjustment of the connections between the pendulum and the throttle.

12. An automatic control for motor vehicles, comprising a frame, a pendulum pivotally supported in said frame, and having a lug projecting therefrom, a plate pivotally supported in the path of movement of said pendulum, and means for manually moving said plate into engagement with the lug on the pendulum, to hold the pendulum against movement.

In testimony whereof, I have hereunto set my hand this 23 day of March 1926.

GEORGE M. HOWELL.